United States Patent
Chen

(10) Patent No.: US 12,303,080 B2
(45) Date of Patent: May 20, 2025

(54) MANUFACTURING METHOD AND MANUFACTURING EQUIPMENT FOR CORRUGATED NET

(71) Applicant: Shu-Han Chen, Changhua Hsien (TW)

(72) Inventor: Shu-Han Chen, Changhua Hsien (TW)

( * ) Notice: Subject to any disclaimer, the term of this patent is extended or adjusted under 35 U.S.C. 154(b) by 0 days.

(21) Appl. No.: 18/755,403

(22) Filed: Jun. 26, 2024

(65) Prior Publication Data

US 2024/0341543 A1    Oct. 17, 2024

Related U.S. Application Data

(62) Division of application No. 17/153,238, filed on Jan. 20, 2021, now Pat. No. 12,059,107.

(51) Int. Cl.
| | |
|---|---|
| B29C 53/30 | (2006.01) |
| A47K 7/02 | (2006.01) |
| B29C 53/22 | (2006.01) |
| B29L 23/00 | (2006.01) |

(52) U.S. Cl.
CPC .............. *A47K 7/02* (2013.01); *B29C 53/22* (2013.01); *B29C 53/30* (2013.01); *B29L 2023/001* (2013.01)

(58) Field of Classification Search
CPC .......... A47K 7/02; B29C 53/22; B29C 53/30; B29L 2023/001
See application file for complete search history.

(56) References Cited

U.S. PATENT DOCUMENTS

| | | | | |
|---|---|---|---|---|
| 3,738,019 A | * | 6/1973 | Forg | D06F 73/02 223/51 |
| 4,863,365 A | * | 9/1989 | Ledoux | B29C 63/343 425/363 |
| 7,097,803 B2 | | 8/2006 | Chang | |
| 2009/0061130 A1 | * | 3/2009 | Camps | B29C 48/13 156/437 |

FOREIGN PATENT DOCUMENTS

CA    2156050    *  5/2000    ............. C04B 28/02

\* cited by examiner

*Primary Examiner* — Christopher M Rodd
*Assistant Examiner* — Shibin Liang
(74) *Attorney, Agent, or Firm* — GUICE PATENTS PLLC

(57) ABSTRACT

The invention relates to a manufacturing method and a manufacturing equipment for a corrugated net. The manufacturing method comprises steps of: injecting a thermoplastic plastic mesh material, the plastic mesh material having an injection temperature; directly reducing a temperature of the plastic mesh material from the injection temperature to a moldable temperature; and pressing the plastic mesh material with the moldable temperature to cause the plastic mesh material with the moldable temperature to form creases. The invention is capable of reducing manufacturing procedures and time by directly adjusting the injected plastic mesh material to the moldable temperature and pressing to form creases without requiring heating equipment, and the moldable temperature of the overall plastic mesh material is uniformly set to be capable of improving an effect of forming corrugated structure for the mesh material.

6 Claims, 8 Drawing Sheets

MANUFACTURING METHOD AND MANUFACTURING EQUIPMENT FOR CORRUGATED NET

CROSS-REFERENCE TO RELATED APPLICATIONS

This application is a divisional application of U.S. application Ser. No. 17/153,238 filed Jan. 20, 2021, and all of which are hereby incorporated by reference in their entirety.

BACKGROUND OF THE INVENTION

Field of Invention

The invention relates to a manufacturing method of mesh material for making bath accessories, and more particularly to a manufacturing method and a manufacturing equipment for a corrugated net.

Related Art

When a person bathes or takes a shower, and washes his or her body, in order to increase the foam produced by the shower cream and increase the effect of exfoliating, a bath accessory such as a bath ball made of a corrugated net is used. FIG. 1 shows a conventional equipment 10 for making a corrugated net, firstly, a net 11 is guided to a heating module 12 formed by a heating plate for heating, and the net 11 is heated (up) to a moldable temperature, so that the net 11 features thermoplastic deformability due to heat, and then the net 11 is guided to a roller set 13, and the said net, which is previously heated up into a state of being moldable, is then squeezed into a container 14, because the net 11 is continuously guided into the container 14, the net 11 in the moldable state is continuously pressed in the container 14 to produce corrugated deformation. After the net 11 in the container 14 accumulates a certain volume and pressure, the pressed net 11 will be released from the container 14 to complete the manufacture of the corrugated net.

However, during the manufacture of the aforementioned conventional corrugated net, the net 11 being used has been cooled and wound, because the net 11 has been cooled and cannot be directly thermoplastically deformed to produce creases, so the heating module 12 is disposed to heat the net 11 to a moldable temperature, and then the net 11 is moved to the container 14 of the equipment 10 to be pressed to form creases. Since the net 11 is an injection-molded mesh body, a thickness of each part is different, and because the heating module 12 conducts heat through air, when the heating module 12 heats the net 11, poor heat conduction efficiency makes the heating effect on the net 11 uneven, and only outer sides of the net 11 and positions close to the heating module 12 will be heated, causing the heating effect on the inner and outer sides uneven.

In addition, when the heating module 12 is used for a long period of time, the cost of electricity consumption is also quite high, resulting in an increase in the overall manufacturing costs, or the heating effect being insufficient, and the net 11 being incapable of reaching a moldable state. Furthermore, the heating module 12 needs to heat the net 11 to a predetermined temperature, so a longer heating time or the heating module 12 with a longer length is required to heat the net 11 to a moldable temperature, thus limiting the feeding speed of the net 11, being incapable of increasing the productivity, and relatively increasing the heating costs of the equipment and the defective rate of the corrugated net in the manufacturing process. Therefore, in the conventional corrugated net manufacturing process, in addition to the pre-operation of cooling and winding before the net 11 is processed, the wound net 11 also needs to be released for heating afterwards, which makes the time required for the whole manufacturing process of the corrugated net and the pre-operation relatively lengthy and increases unnecessary costs.

SUMMARY OF THE INVENTION

A main object of the invention is to provide a manufacturing method and a manufacturing equipment for directly forming a corrugated net in a same manufacturing process after injection molding to simplify the manufacturing process.

Another object of the invention is to provide a manufacturing method and a manufacturing equipment for a corrugated net, which do not require additional heating equipment to heat the net to be capable of reducing processing and equipment costs.

In order to achieve the above-mentioned objects, the invention provides a manufacturing method for a corrugated net, comprising:

A. an injection step: injecting a thermoplastic plastic mesh material, the plastic mesh material having an injection temperature;

B. holding temperature control: directly guiding the plastic mesh material with the injection temperature to a temperature adjustment equipment, and cooling the plastic mesh material down to a moldable temperature; and C. corrugation by pressing: pressing the plastic mesh material with the moldable temperature to cause the plastic mesh material with the moldable temperature to form creases during the pressing process.

And, in order to achieve the above manufacturing method, the manufacturing equipment for the corrugated net provided by the invention comprises:

an injection machine with an injection mechanism capable of injecting a thermoplastic plastic mesh material with an injection temperature;

a temperature adjustment equipment with a holding temperature space, the holding temperature space is accommodated with a liquid holding temperature medium to cool the plastic mesh material down to a moldable temperature by the liquid holding temperature medium; and a pressing unit with a compartment, inside the compartment is a chamber, the plastic mesh material is pressed in the chamber to form creases; the chamber is also provided with a compartment door, the compartment door opens and closes according to changes of a pressing pressure in the chamber to make the corrugated net.

The manufacturing method and the manufacturing equipment for the corrugated net provided by the invention are capable of firstly and directly reducing a temperature of the injected thermoplastic plastic mesh material from the injection temperature to the moldable temperature through the temperature adjustment equipment, and then pressing the plastic mesh material with the moldable temperature to form creases. Compared with the conventional manufacturing method employing a two-stage process of cooling and winding the plastic mesh material, and then heating the wound plastic mesh material, the manufacturing method of the invention does not require additional heat sources or heating equipment to heat the plastic mesh material, temperatures inside and outside the plastic mesh material can be made uniform, and uniform creases can be formed during pressing to improve a yield of the finished product, and the invention is a continuous one-time processing procedure from injection to pressing to form creases, which can reduce manufacturing time and costs.

BRIEF DESCRIPTION OF THE DRAWINGS

The present invention can be best understood through the following description and accompanying drawings, wherein.

DETAILED DESCRIPTION OF THE INVENTION

Figure 1:
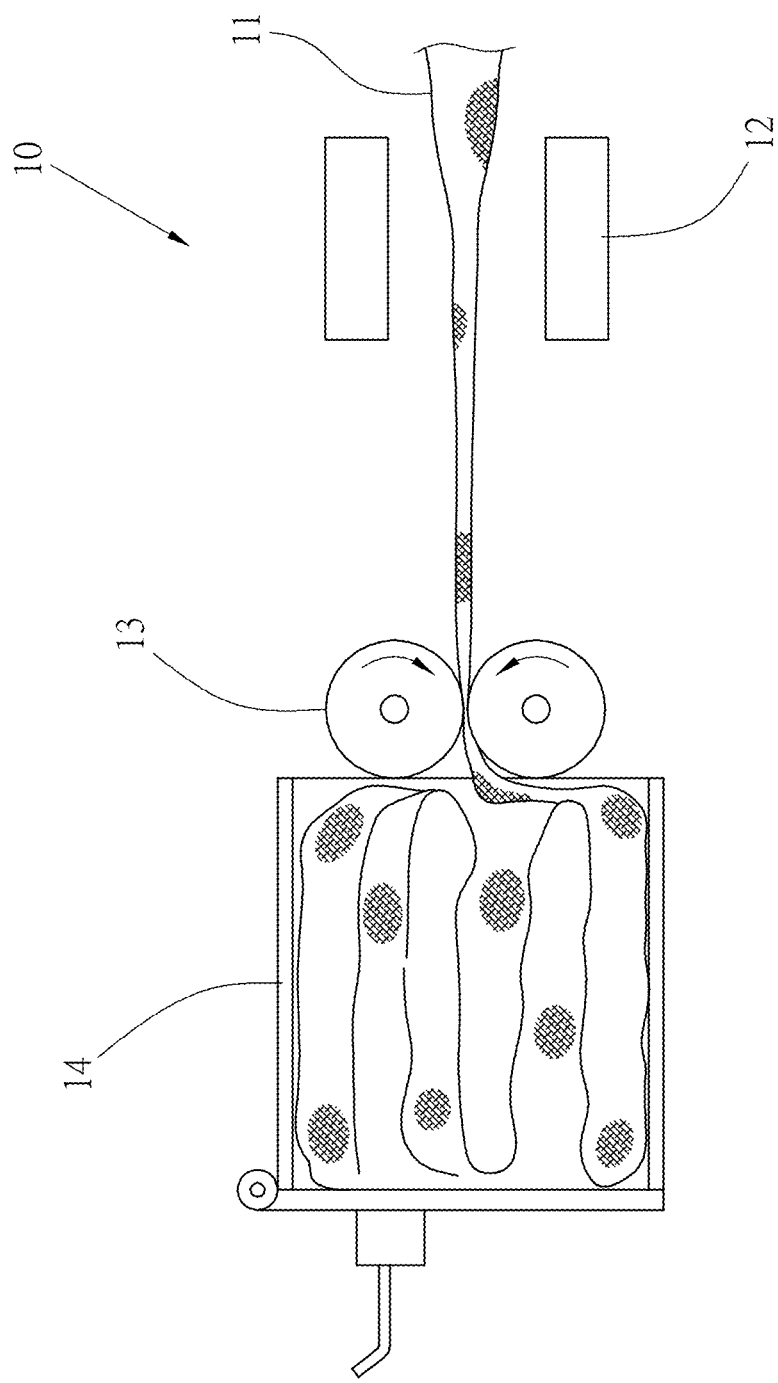
FIG. 1 is a schematic diagram of a conventional method and equipment for manufacturing a corrugated net.
Figure 2:
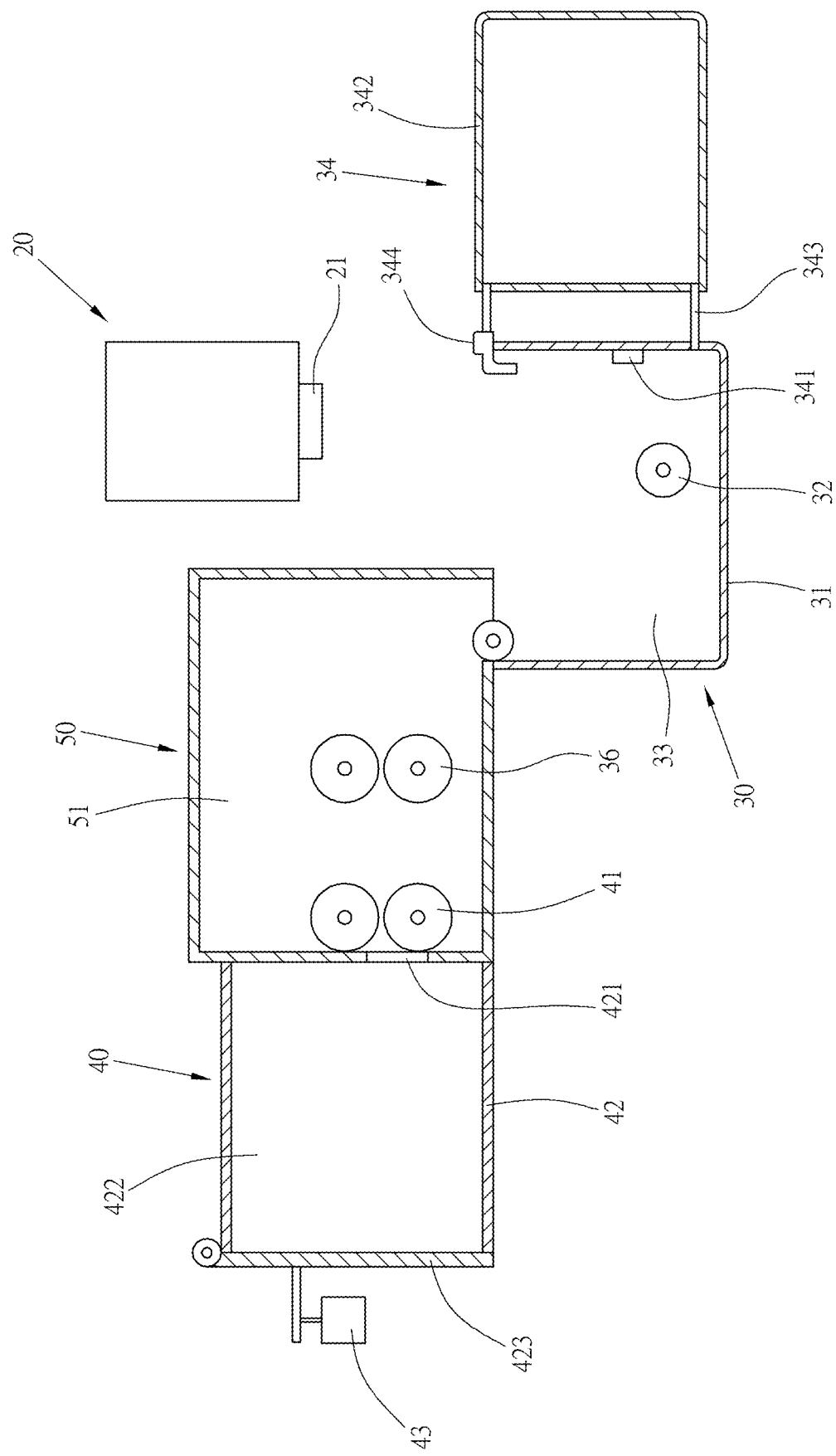
FIG. 2 is a schematic diagram of an overall equipment according to a preferred embodiment of the invention.
Figure 3:
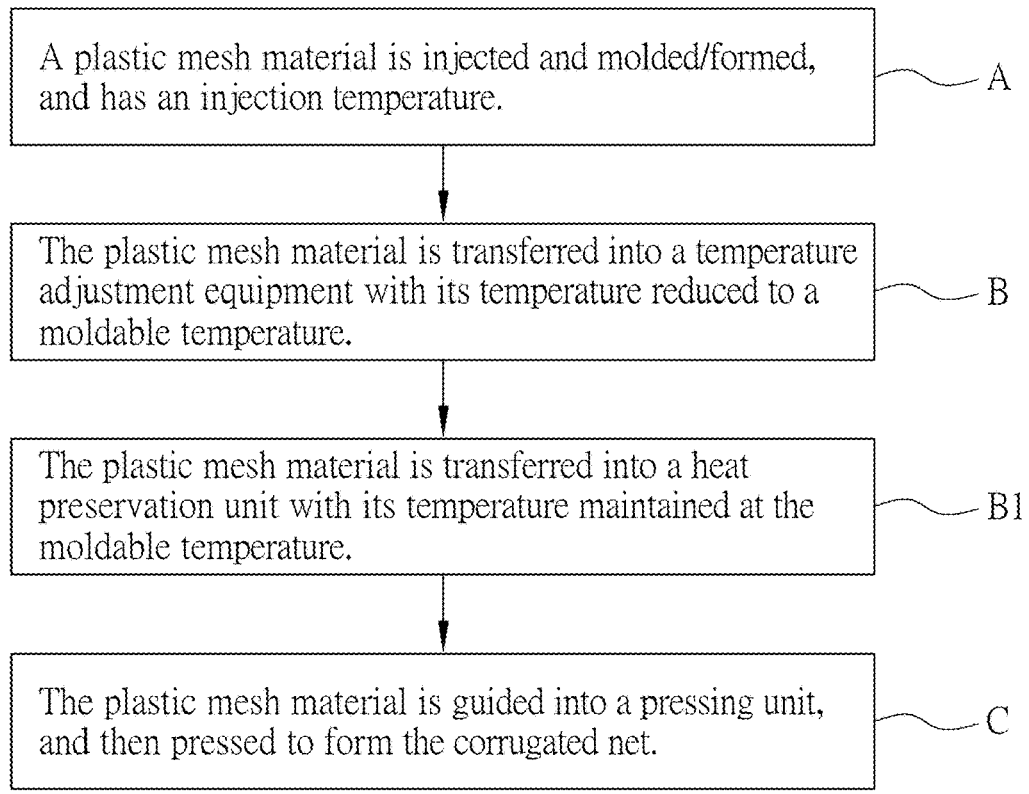
FIG. 3 is a production flow chart according to a preferred embodiment of the invention.
Figure 4:
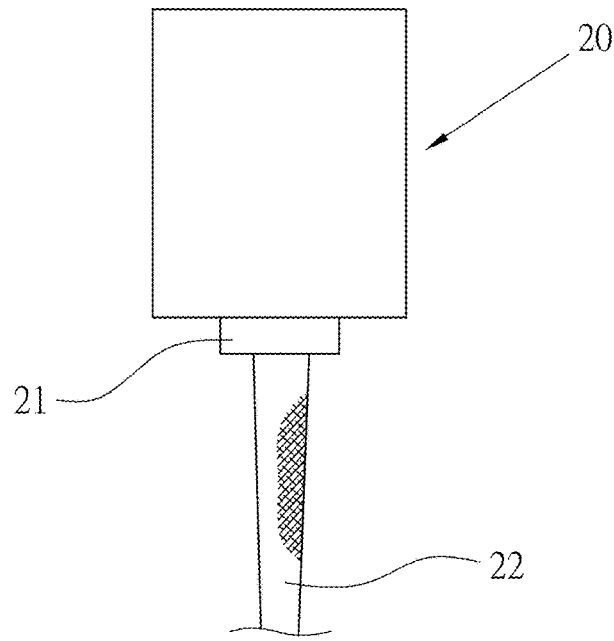
FIG. 4 is a schematic diagram of a plastic mesh material injected by an injection machine according to a preferred embodiment of the invention.

Please refer to FIGS. 2 to 3 for a manufacturing equipment and a manufacturing process for a corrugated net provided by a preferred embodiment of the invention. The equipment comprises following components:

An injection machine 20 as shown in FIGS. 2 and 4, the injection machine 20 has an injection mechanism 21, the injection mechanism 21 is capable of continuously injecting thermoplastic raw materials to form a thermoplastic plastic mesh material 22 as required. The plastic mesh material 22 is a continuous mesh structure, but it is not limited thereto; as long as it is a plastic product with thermoplasticity, it can be made to form creases; when the plastic mesh material 22 is injected and formed by the injection mechanism 21, the plastic mesh material 22 has an injection temperature, and the temperature is between 160 and 300 degrees Celsius.

Figure 5:
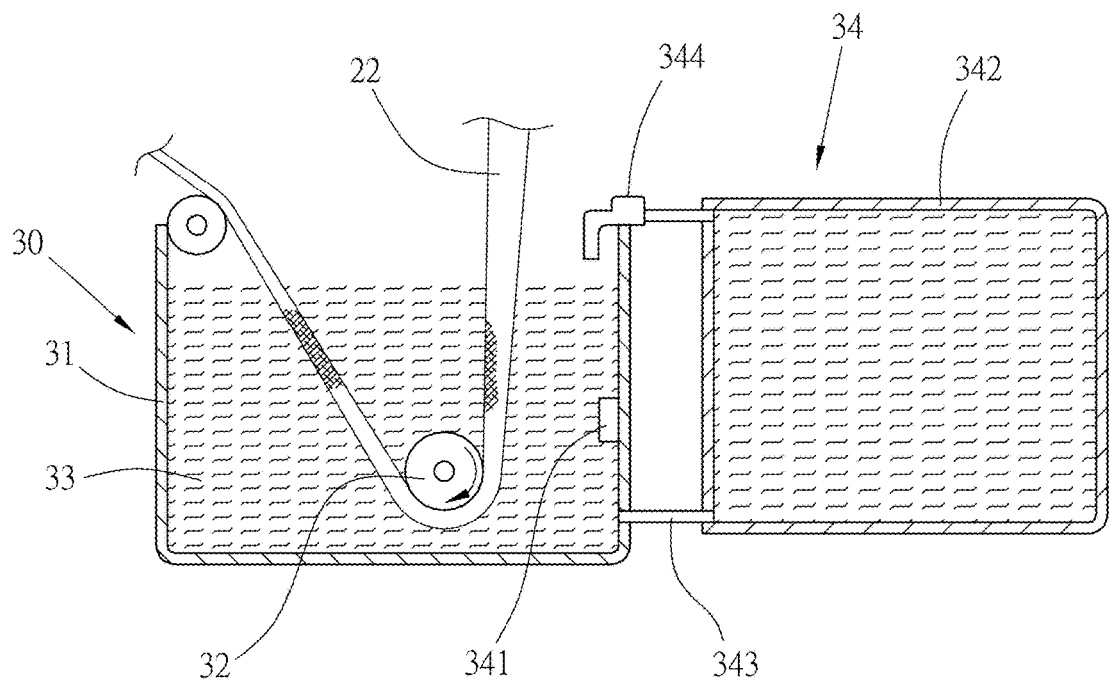
FIG. 5 is a schematic diagram of a temperature of the plastic mesh material being directly cooled down by a temperature adjustment equipment after injection molding according to a preferred embodiment of the invention.
Figure 6:
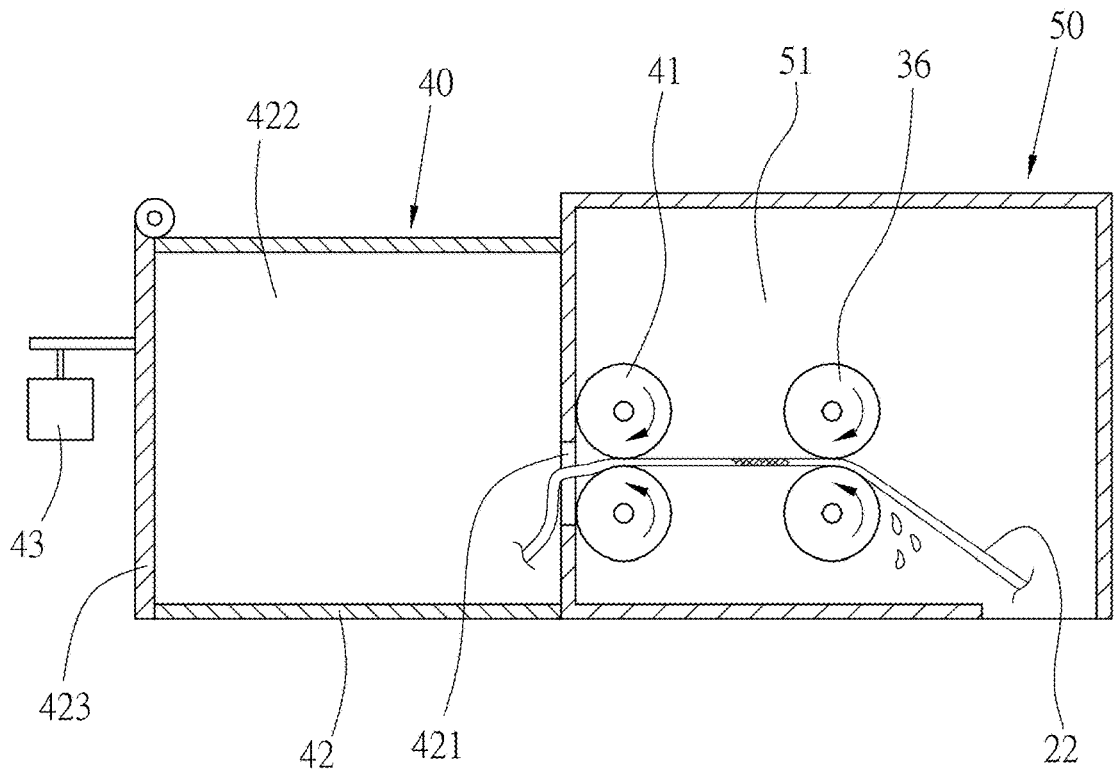
FIG. 6 is a schematic diagram of draining after the plastic mesh material is guided out of the temperature adjustment equipment according to a preferred embodiment of the invention.

A temperature adjustment equipment 30 as shown in FIGS. 5 and 6, in this embodiment, the temperature adjustment equipment 30 is composed of a solution tank 31, a roller 32 and a temperature control device 34. Inside the solution tank 31 is a holding temperature space, inside the holding temperature space can be filled with a liquid holding temperature medium 33 to keep the holding temperature space of the solution tank 31 at a certain temperature; the liquid holding temperature medium 33 in this embodiment is warm water between 40 and 80 degrees Celsius. The temperature control device 34 is provided with a temperature sensor 341 and a circulating solution tank 342, the temperature sensor 341 senses a temperature of the liquid holding temperature medium 33 of the solution tank 31; the circulating solution tank 342 is an exchange tank with a liquid holding temperature medium (exchange medium for short) for exchange and with a lower temperature. In this embodiment, the circulating solution tank 342 is a cold water tank with a lower temperature, and its exchange medium is cold water with a lower temperature. The circulating solution tank 342 of the temperature control device 34 communicates with the solution tank 31 through an outlet 343 and an inlet 344 for circulating the liquid holding temperature medium 33. When the temperature sensor 341 senses that a water temperature of the liquid holding temperature medium 33 in the solution tank 31 rises and changes, for example, when a temperature of the liquid holding temperature medium 33 is increased to a set temperature (for example, 70° C., but it is not limited thereto) caused by continuous importing of the plastic mesh material 22 into the solution tank 31, exchange process of the holding temperature medium is started. The liquid holding temperature medium 33 is circulated and exchanged between the circulating solution tank 342 and the solution tank 31 through the outlet 343 and the inlet 344 in order to adjust a temperature of the liquid holding temperature medium 33 in the holding temperature space of the solution tank 31, so that a liquid temperature in the solution tank 31 can be maintained within a fixed temperature range; and the roller 32 is disposed inside the solution tank 31. Further comprising: a draining wheel set 36 disposed outside the solution tank 31.

Figure 7:
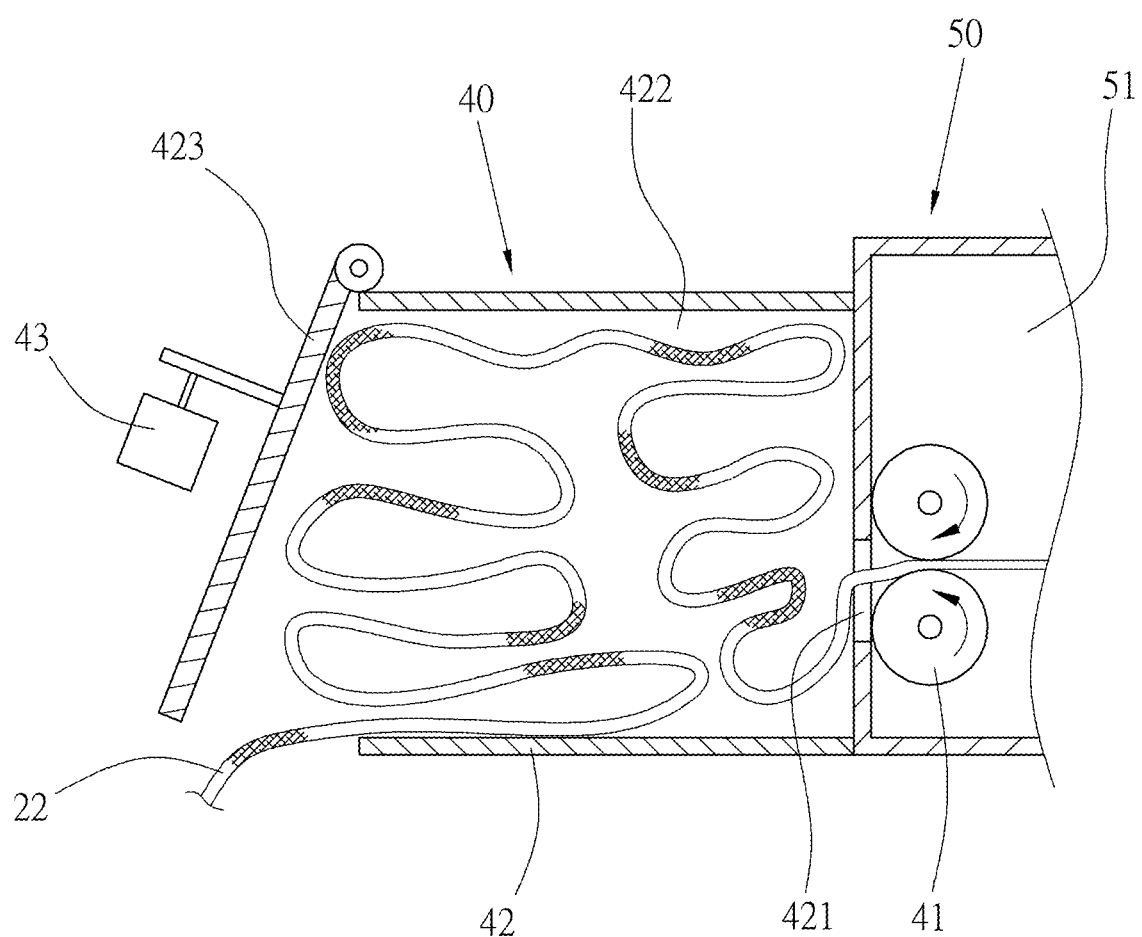
FIG. 7 is a schematic diagram of the plastic mesh material being pressed in a pressing unit to form creases according to a preferred embodiment of the invention.

A pressing unit 40 as shown in FIG. 7, the pressing unit 40 has a guiding wheel set 41, a compartment 42 and a counterweight 43; the guiding wheel set 41 is disposed in front of the compartment 42, and the compartment 42 is provided with an importing port 421 adjacent to the guiding wheel set 41. Inside the compartment 42 is provided with a chamber 422, and the importing port 421 communicates with the chamber 422. The compartment 42 is additionally provided with a compartment door 423, the compartment door 423 is capable of selectively opening or closing the chamber 422, so that the chamber 422 is in an opened or a closed state. The counterweight 43 is hung on an outer side of the compartment door 423, and is capable of providing the compartment door 423 with a closing weight. When a pressure in the chamber 422 is greater than a closing force of the counterweight 43 and the compartment door 423, the compartment door 423 will be pushed and opened, so that the chamber 422 is in an opened state, and the plastic mesh material 22 can be released from the chamber 422.

A heat preservation unit 50 as shown in FIG. 7, the heat preservation unit 50 is provided between the temperature adjustment equipment 30 and the pressing unit 40. In this embodiment, the heat preservation unit 50 is disposed at a position where the draining wheel set 36 and the guiding wheel set 41 are provided, inside the heat preservation unit 50 is a heat preservation chamber 51, and a temperature in the heat preservation chamber 51 is kept within a moldable temperature range of the plastic mesh material 22. The draining wheel set 36 and the guiding wheel set 41 are also located in a moldable temperature environment.

Figure 8:
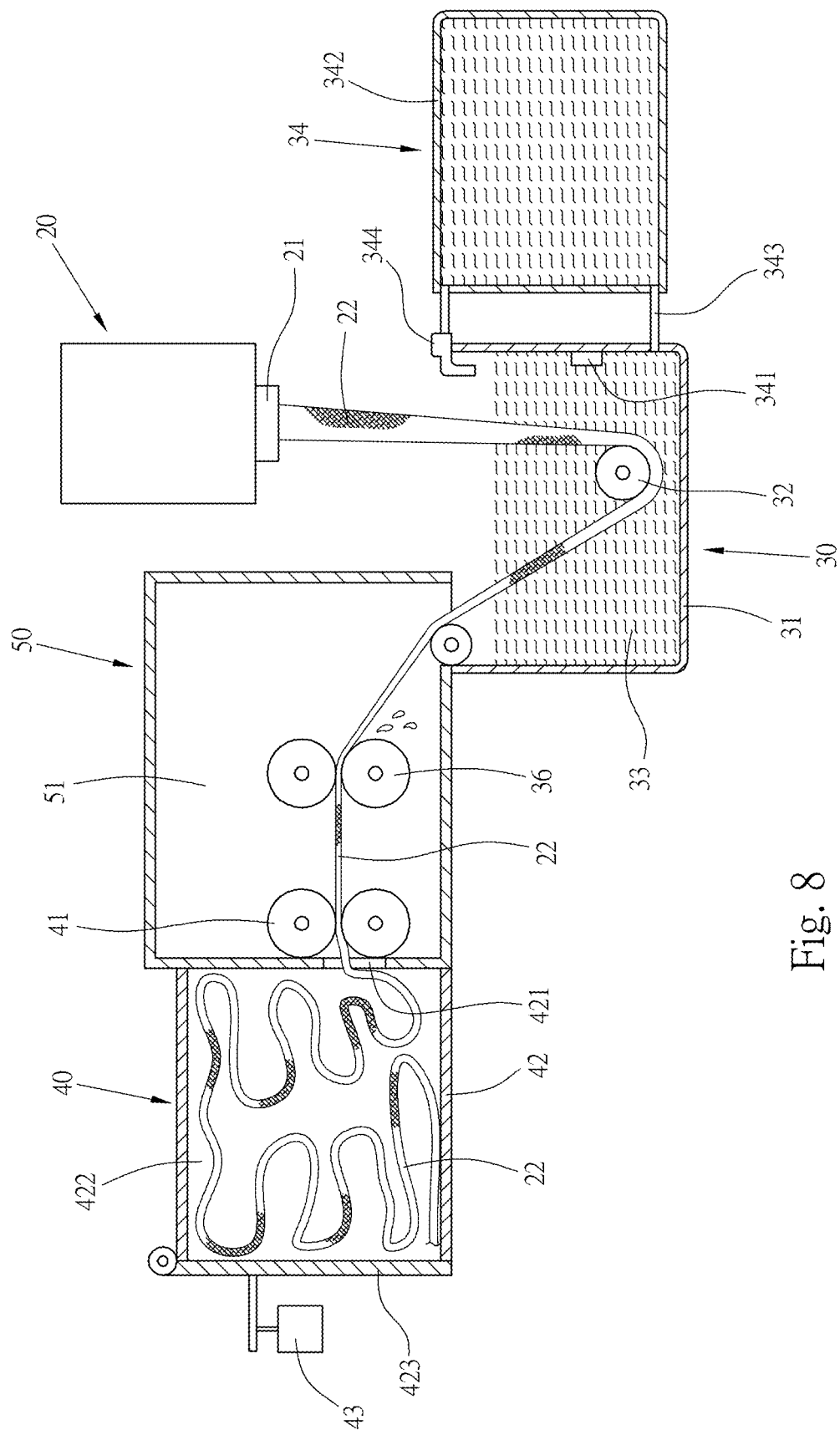
FIG. 8 is a schematic diagram of operations of the overall equipment according to a preferred embodiment of the invention.
Figure 9:
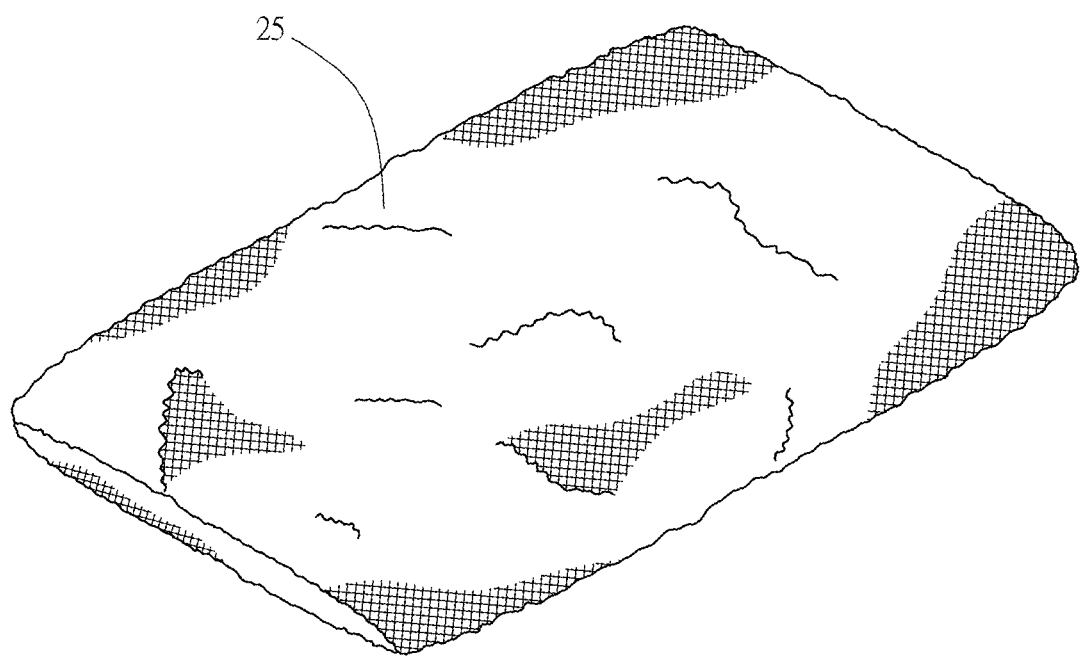
FIG. 9 is a schematic diagram of the corrugated net made by the manufacturing method of the invention.

Please refer to FIGS. 3 and 8, a manufacturing method for the corrugated net of the invention comprises following steps of:

- an injection step: referring to FIG. 4, injecting and forming the plastic mesh material 22 continuously through the injection mechanism 21 of the injection machine 20, the plastic mesh material 22 being a tubular mesh material with meshes, the plastic mesh material 22 having the injection temperature and being in a high temperature state right after being injected; and then transferring the injection-molded plastic mesh material 22 directly to the temperature adjustment equipment 30;
- holding temperature control: referring to FIGS. 5 and 6, transferring the plastic mesh material 22 with the injection temperature toward the temperature adjustment equipment 30, transferring the plastic mesh material 22 into the solution tank 31, winding the plastic mesh material 22 on the roller 32 so that inside and outside of the plastic mesh material 22 being fully immersed in the solution tank 31; because the solution tank 31 is filled with the liquid holding temperature medium 33 of 40 to 80 degrees Celsius, the original injection temperature of the plastic mesh material 22 is controlled and reduced to a temperature close to that of the liquid holding temperature medium 33 in the solution tank 31, so that a temperature of the plastic mesh material 22 is maintained at a moldable and deformable operating temperature—that is, a moldable temperature of 40 to 80 degrees Celsius; because the plastic mesh material 22 originally has a relatively high temperature after being injection-molded by the injection machine 20, when the plastic mesh material 22 is guided into the solution tank 31, a temperature of the liquid holding temperature medium 33 in the holding temperature space of the solution tank 31 will also increase relatively, through the temperature control device 34, the temperature sensor 341 can sense a temperature in the solution tank 31, and the exchange medium is imported from the circulating solution tank 342 to adjust a temperature of the liquid holding temperature medium 33 and through circulation of the exchange medium to keep a temperature of the holding temperature space of the solution tank 31 within the moldable temperature range; in addition, a thermostat (not shown in the figures) can be circumferentially disposed on the solution tank 31, and a temperature in the solution tank 31 can be controlled directly through the thermostat; in this embodiment, rollers are used to continuously transfer the plastic mesh material 22, after a temperature of the plastic mesh material 22 is cooled down to the moldable temperature in the solution tank 31, the plastic mesh material 22 is removed from the solution tank 31, and then the plastic mesh material 22 is inserted into the draining wheel set 36, the draining wheel set 36 will exert a pressing effect on the plastic mesh material 22 to drain the liquid holding temperature medium 33 impregnated in the plastic mesh material 22, that is, squeezing out the water; it should be explained that it is not necessary for the draining wheel set 36 to completely drain the water absorbed by the plastic mesh material 22, it is only required to drain most of the water;
- B1. a heat preservation step: referring to FIG. 7, the heat preservation unit 50 forming a heat preservation effect on the plastic mesh material 22 removed from the temperature adjustment equipment 30 and preventing temperature reduction, for example, by disposing insulation material in the heat preservation chamber 51; the plastic mesh material 22 passes through the heat preservation chamber 51, so that the plastic mesh material 22 is not directly exposed to the outside, and a temperature of the plastic mesh material 22 can be maintained within the moldable temperature range; and
- corrugation by pressing: referring to FIG. 7, after the plastic mesh material 22 passing through the draining wheel set 36, a temperature of the plastic mesh material 22 being equal to or slightly lower than a temperature in the solution tank 31, but still maintained within the thermoplastic moldable temperature, then, the plastic mesh material 22 being guided into the pressing unit 40, and the plastic mesh material 22 being inserted into the guiding wheel set 41; the heat preservation unit 50 is capable of ensuring that a temperature of the plastic mesh material 22 after it being removed from the temperature adjustment equipment 30 and before entering the pressing unit 40 can be maintained within the moldable temperature to avoid a sudden temperature drop; the guiding wheel set 41 will continue to tuck the plastic mesh material 22 from the importing port 421 of the compartment 42 into the chamber 422; the plastic mesh material 22 is pressed in the chamber 422 to form an irregular stack, because the plastic mesh material 22 is still maintained within the thermoplastic deformable moldable temperature, when the plastic mesh material 22 is pressed in the chamber 422 until generated creases of the plastic mesh material 22 in the chamber 422 accumulate to a certain extent, a pressing pressure generated by the plastic mesh material 22 will exert a pushing effect on the compartment door 423, when a pushing force of the plastic mesh material 22 is greater than a weight of the counterweight 43, the plastic mesh material 22 will push and open the compartment door 423, so that the pressed plastic mesh material 22 will be released from an opened position of the compartment door 423 to form the corrugated net 25 as shown in FIG. 9. The corrugated net 25 of FIG. 9 is an illustration only and is not limited thereto.

In the method and the equipment for manufacturing the corrugated net provided by the invention, after the injection machine injects the plastic mesh material with the injection temperature, a temperature of the plastic mesh material is directly reduced to the moldable temperature for processing to form creases; compared with the conventional manufacturing method of cooling and winding the plastic mesh material before heating, the manufacturing method of the invention does not require heating after cooling, which reduces processing procedures, and the plastic mesh material is completed in one processing procedure from injection to pressing to form creases. In addition to reducing the production time, further processing steps can be eliminated. Furthermore, the manufacturing method of the invention does not require heating equipment, which can save the costs of heating equipment and electricity. In addition, the manufacturing method of the invention cools the plastic mesh material down to the moldable temperature through the liquid holding temperature medium of the temperature adjustment equipment, the liquid heat exchange effect is good and the speed is fast, so that the plastic mesh material has the same moldable temperature inside and outside without temperature difference, and the creases formed by pressing are more uniform, which can improve the yield and quality.

Figure 10:
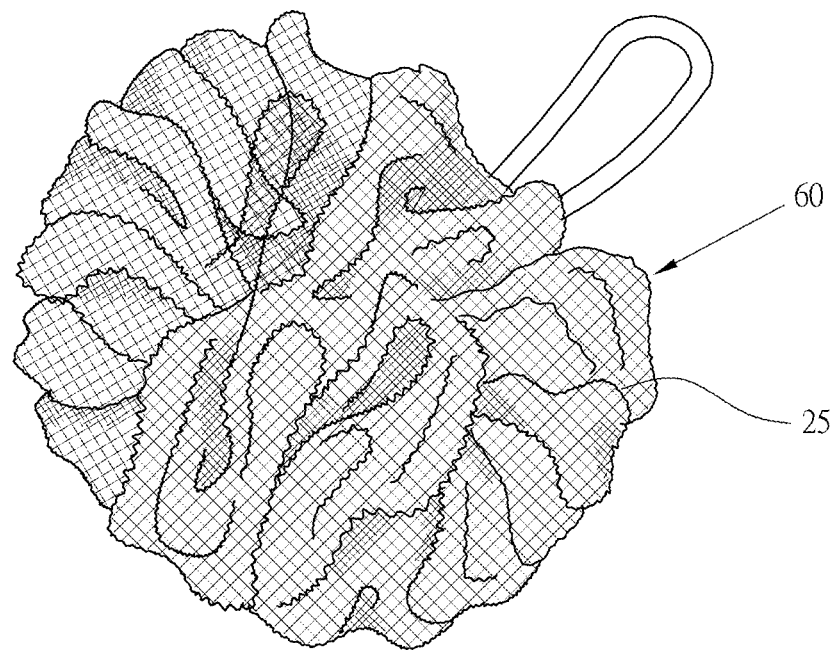
FIG. 10 is a perspective view of a bath ball made from the corrugated net of the invention.
Figure 11:
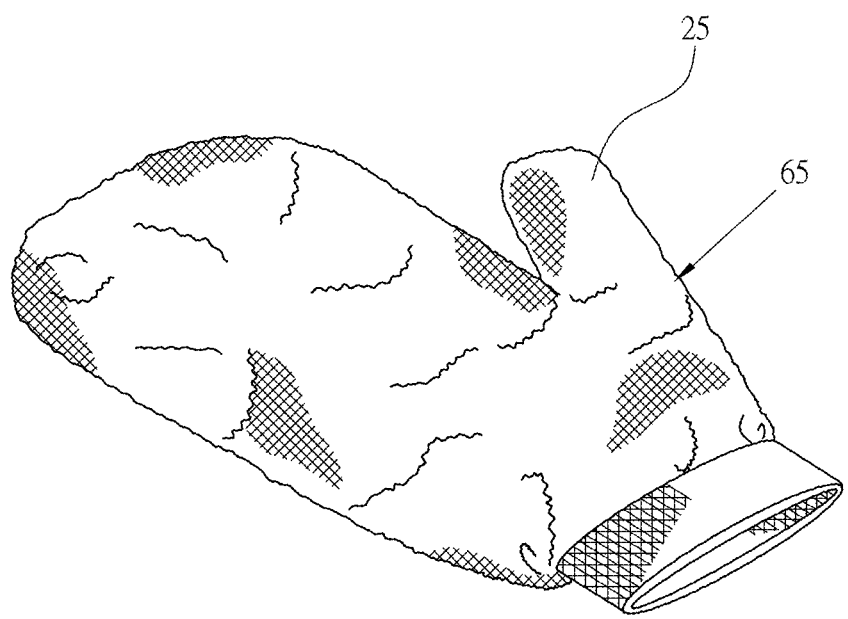
FIG. 11 is a perspective view of a bath glove made from the corrugated net of the invention.

Please refer to FIG. 10 and FIG. 11, after the plastic mesh material 22 is creased and corrugated, and made into the corrugated net 25, the corrugated net 25 can be manufactured into a variety of bath supplies catering to various requirements. For example, the corrugated net 25 can be made into a bath ball 60 or a bath glove 65. Because of creases in the surface of the corrugated net 25, through scrubbing and rubbing the said material with soap or body wash, an effect to produce foams and bubbles is enhanced, which increases an effect of cleaning.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A manufacturing equipment for a corrugated net, comprising:
   an injection machine with an injection mechanism capable of injecting a thermoplastic plastic mesh material with an injection temperature;
   a temperature adjustment equipment with a holding temperature space, the holding temperature space being accommodated with a liquid holding temperature medium to cool the plastic mesh material down to a moldable temperature after the plastic mesh material passing through the liquid holding temperature medium; and
   a pressing unit with a compartment, inside the compartment being a chamber, the plastic mesh material being pressed in the chamber to form creases; the chamber being also provided with a compartment door, the compartment door opening and closing according to changes of a pressing pressure in the chamber.

2. The manufacturing equipment as claimed in claim 1, wherein the temperature adjustment equipment has a solution tank, a holding temperature space is formed in the solution tank, and the holding temperature space of the solution tank is filled with the liquid holding temperature medium.

3. The manufacturing equipment as claimed in claim 2, further comprising a temperature control device, the temperature control device including a temperature sensor and a circulating solution tank, the temperature sensor being capable of sensing a temperature in the solution tank, and the circulating solution tank providing a liquid holding temperature medium of different temperatures to adjust a temperature of the liquid holding temperature medium in the solution tank.

4. The manufacturing equipment as claimed in claim 2, further comprising a draining wheel set disposed outside the holding temperature space and located between the temperature adjustment equipment and the pressing unit.

5. The manufacturing equipment as claimed in claim 4, wherein further comprising a eat preservation unit disposed between the temperature adjustment equipment and the pressing unit, inside the heat preservation unit being a heat preservation chamber, and a temperature in the heat preservation chamber being maintained within the moldable temperature.

6. The manufacturing equipment as claimed in claim 1, wherein the compartment of the pressing unit has an importing port, the importing port communicates with the chamber; a front end of the importing port is provided with a guiding wheel set, and the plastic mesh material is moved into the chamber through the importing port from the guiding wheel set.

* * * * *